United States Patent
Kapuria

(10) Patent No.: US 10,703,474 B2
(45) Date of Patent: Jul. 7, 2020

(54) TETHERED UNMANNED AERIAL VEHICLE

(71) Applicant: THE HI-TECH ROBOTIC SYSTEMZ LTD, Gurugram, Haryana (IN)

(72) Inventor: Anuj Kapuria, Haryana (IN)

(73) Assignee: THE HI-TECH ROBOTIC SYSTEMZ LTD, Gurugram (IN)

( * ) Notice: Subject to any disclaimer, the term of this patent is extended or adjusted under 35 U.S.C. 154(b) by 152 days.

(21) Appl. No.: 15/680,248

(22) Filed: Aug. 18, 2017

(65) Prior Publication Data

US 2018/0050798 A1    Feb. 22, 2018

(30) Foreign Application Priority Data

Aug. 20, 2016   (IN) .............................. 201611028394

(51) Int. Cl.
| | |
|---|---|
| *B64C 39/02* | (2006.01) |
| *G05D 1/10* | (2006.01) |
| *G05D 1/08* | (2006.01) |
| *B64F 3/02* | (2006.01) |
| *B60L 58/12* | (2019.01) |
| *B60L 53/22* | (2019.01) |
| *B64D 47/08* | (2006.01) |

(52) U.S. Cl.
CPC ............ *B64C 39/022* (2013.01); *B60L 53/22* (2019.02); *B60L 58/12* (2019.02); *B64C 39/024* (2013.01); *B64D 47/08* (2013.01); *B64F 3/02* (2013.01); *G05D 1/0866* (2013.01); *G05D 1/104* (2013.01); *B60L 2200/10* (2013.01); *B64C 2201/042* (2013.01); *B64C 2201/141* (2013.01); *B64C 2201/146* (2013.01)

(58) Field of Classification Search
CPC ................ B64C 39/022; B64C 39/024; B64C 2201/042; B64C 2201/141; B64C 2201/146; B64D 47/08; B60L 2200/10; B60L 11/1812; B60L 11/1861; B60L 58/12; B60L 53/22; G05D 1/104; G05D 1/0866; B64F 3/02
See application file for complete search history.

(56) References Cited

U.S. PATENT DOCUMENTS

| | | | | |
|---|---|---|---|---|
| 7,631,834 | B1 * | 12/2009 | Johnson ................ | B64C 39/024 244/17.11 |
| 8,602,349 | B2 * | 12/2013 | Petrov .................. | B64C 39/022 244/17.23 |
| 9,056,676 | B1 * | 6/2015 | Wang ........................ | B64F 1/00 |
| 9,273,981 | B1 * | 3/2016 | Downey ................ | B64C 39/024 |
| 9,376,208 | B1 * | 6/2016 | Gentry .................. | B64C 39/024 |

(Continued)

*Primary Examiner* — Nicholas Kiswanto

(57) ABSTRACT

A tethered UAV (102) is disclosed. The UAV (102) may carry a payload (104). The payload may include camera, radio mast, or sensors. Power supply to the UAV (102) via a tether cable (108) from a ground station (106) may be varied using a reconfigurable power converter. Further, the UAV (102) may enter an autopilot mode based on a disruption of power supply from a power source at the ground station (106), low energy level of the power source, and a temperature of the power converter. In the autopilot mode, power may be supplied to the UAV (102) from an on-board battery and wireless communication may be initiated between the UAV (102) and the ground station (106) via a network (110).

5 Claims, 13 Drawing Sheets

(56) References Cited

U.S. PATENT DOCUMENTS

| | | | | |
|---|---|---|---|---|
| 9,511,878 | B1* | 12/2016 | McDermott | B64D 47/08 |
| 9,800,091 | B2* | 10/2017 | Nugent, Jr. | H02J 50/30 |
| 10,011,352 | B1* | 7/2018 | Dahlstrom | B05B 13/005 |
| 2011/0180667 | A1* | 7/2011 | O'Brien | B64C 39/022 |
| | | | | 244/135 R |
| 2013/0233964 | A1* | 9/2013 | Woodworth | B64D 17/80 |
| | | | | 244/2 |
| 2015/0370250 | A1* | 12/2015 | Bachrach | G05D 1/0016 |
| | | | | 701/2 |
| 2016/0244176 | A1* | 8/2016 | Xiao | B60L 7/10 |
| 2017/0015417 | A1* | 1/2017 | Bishop | B64C 27/20 |
| 2017/0136887 | A1* | 5/2017 | Ricci | B64C 39/024 |
| 2017/0158079 | A1* | 6/2017 | Lim | H02J 7/04 |

* cited by examiner

TETHERED UNMANNED AERIAL VEHICLE

CROSS REFERENCE TO RELATED APPLICATIONS

The present application claims the benefit of Indian Patent application 201611028394 filed on Aug. 20, 2016. All the above are hereby incorporated by reference.

FIELD OF THE INVENTION

The present invention, in general relates to unmanned aerial vehicles (UAVs). In particular, the present invention relates to tethered unmanned aerial vehicles.

BACKGROUND OF THE INVENTION

Generally, various types of UAVs are known in the art such as multi-rotor, fixed wing aircrafts, and lighter than air aerostats. The UAVs are readily deployed in environments which may be unsafe for humans or for different projects and missions where it is infeasible to have human operators. Such UAVs are widely implemented in military and civilian quarters for various aerial operations of remote surveillance, transferring objects from one place to another, etc. However, manufacturing and operating the UAVs are generally expensive and the UAVs lack heavy equipment/sensor payload support and operation for prolonged duration.

OBJECTS OF THE INVENTION

It is an object of the present invention to provide a UAV having prolonged flight time.

It is another object of the present invention to provide a tethered UAV.

It is another object of the present invention to provide a ground power supply to a tethered UAV using a tether cable.

It is another object of the present invention to provide a tethered UAV with different types of power supply sources.

It is another object of the present invention to provide a system of a plurality of UAVs coordinating with one another to monitor an area.

SUMMARY OF THE INVENTION

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

The present invention discloses a tethered UAV system. The UAV system includes a UAV and a ground station coupled to the UAV with a tether cable. The UAV may be utilized for area monitoring, weather monitoring, traffic monitoring, event coverage, etc. In one implementation, the UAV may carry a payload and include an on-board battery and a reconfigurable power converter. As would be understood that the payload may be a camera, a radio mast, or one or more sensors. The one or more sensors may be a smoke sensor, a temperature sensor, a GPS sensor, or a Chemical Biological Radiological Nuclear sensor. The on-board power supply is configured to supply power to the UAV during flight. The power converter is capable of receiving power from a power source of a ground station and supplying the received power to the UAV based on an instruction from the control unit in a varying level. The power variation may be based on a weight of the payload, flight status of the UAV that may include ascending or facing a windy weather etc. The UAV system also includes a central unit coupled to an electronic speed controller. The central unit may store preprogrammed instructions to control the UAV. Also, the electronic speed controller helps the UAV to regulate its flying speed.

The Ground Station aids in operating the UAV from ground based on various instructions issued to the UAV and provide the requisite power required by the UAV during its flight. In one implementation, the ground station includes a power source and a control unit. The power source 324 may be an alternating current or direct current power source. The control unit is responsible for overall functioning of the ground station and controlling the UAV. The tether cable supplies electric power from the power source of the ground station to the power converter of the UAV. The tether cable also supplies electric power to the on-board battery of the UAV for recharging the battery. The ground station may further include a power system to control the overall power requirements of the UAV The power system may be coupled to the control unit Thus, the present subject matter provides efficient system for providing varied levels of power to a UAV. The power requirements of the UAV may change based on the various operational status of the UAV like payload weight, flight status of the UAV, etc. The system determines appropriate power level for the UAV and provides the UAV with that power as determined thereby providing prolonged operation.

These and other objects, embodiments and advantages of the present disclosure will become readily apparent to those skilled in the art from the following detailed description of the embodiments having reference to the attached figures, the disclosure not being limited to any particular embodiments disclosed.

BRIEF DESCRIPTION OF THE DRAWINGS

For a better understanding of the embodiments of the systems and methods described herein, and to show more clearly how they may be carried into effect, references will now be made, by way of example, to the accompanying drawings, wherein like reference numerals represent like elements/components throughout and wherein.

DETAILED DESCRIPTION OF THE INVENTION

Figure 1:
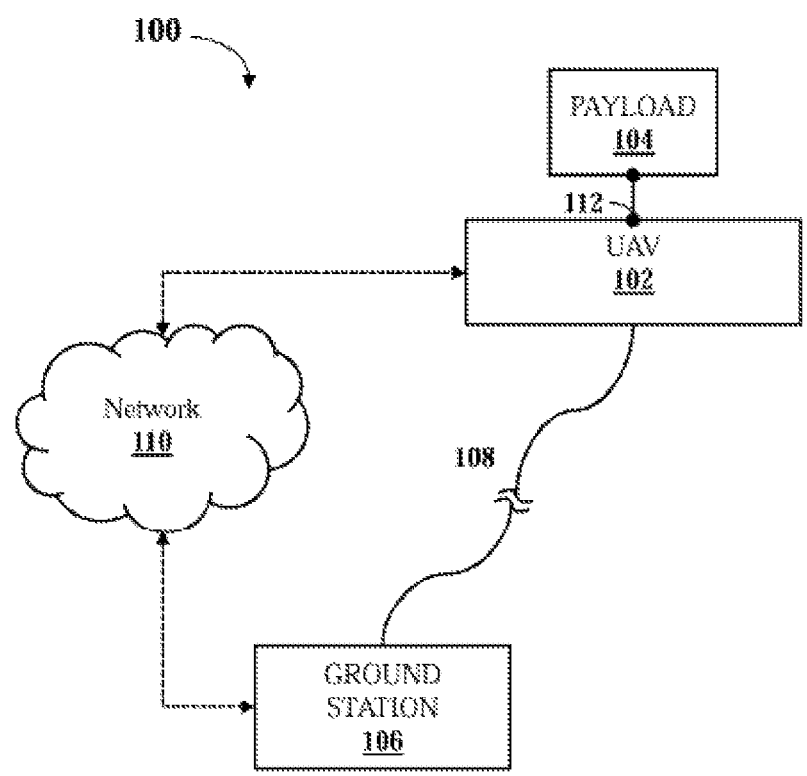
FIG. 1 illustrates a schematic diagram of a UAV carrying a payload, the UAV coupled to a ground station, in accordance with an embodiment of the present invention.

Exemplary embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art.

The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates an unmanned aerial vehicle (UAV) system 100. The system 100 includes a UAV 102 coupled to a ground station 106 via a tether cable 108. The tether cable 108 may carry communication data between the UAV 102 and the ground station 106.

The UAV 102 may be of any type unmanned aerial vehicle and may be utilized for a variety of purposes. In one embodiment, the UAV 102 may be a tethered multirotor system. The multi rotor system can be automatically deployed without requiring a human operator. The multirotor system may be a pure electrical power airborne tethered platform for observation and other applications. In one embodiment, the UAV 102 is a quad rotor system. In one embodiment, the UAV 102 may be propelled by an electric propulsion system. In one embodiment, there are four out runner brushless motors fitted with the propeller for thrust generation. Each motor propeller combination may have the capability of providing about 12-14 Kgs of vertical thrust at full throttle.

The UAV 102 may have one click operation where a single command from the ground station 106 may initiate the UAV 102 flight and operations. In some embodiments, the flight time of the UAV 102 may be scheduled in advance. In this case, the UAV 102 may initiate operations at the scheduled time without any human intervention.

The UAV system 100 of the present invention is capable of deploying the UAV 102 for any operation within minutes. In an embodiment, the UAV 102 may be deployed in less than 60 seconds.

The UAV 102 is further capable of performing operations or missions with low signatures, that is, the UAV 102 may perform stealth operations without being detected by hostile agents. The UAV 102 may have structural feature or body coat to divert or absorb radiations.

The ground station 106 may be a fixed ground station (FGS) or a portable ground station (PGS). The FGS may include a home, an office, a building or any other outdoor platform that is stationary with respect to earth.

In an alternative embodiment, the PSG may be integrated or attached to a ground vehicle or a water vessel, an All-Terrain vehicle (ATV), or any other movable platform that is mobile with respect to the earth. Examples of a movable platform may include but not limited to a car, a truck, an autonomous vehicle, a ship, a boats, and an autonomous robot.

The network 110 may be a wired network, a wireless network or a combination thereof. The network 110 may be any network including, but not limited to, an optical network, a cellular network, a satellite network, a Local Area Network (LAN), IEEE 802.XX network, Wide Area Network (WAN), SCSI, ATA, and the Internet or a combination thereof.

In another embodiment, the communication link via the tether cable 108 and the network 110 may work as supplement or substitute of one another for facilitating communications between the UAV 102 and the ground station 106.

During operation, the UAV 102 may transmit a variety of data such as audio, video, images or parametric data relating to working of the UAV 102. The data may be transmitted to the ground station 106. Data relating to the UAV 102 may be gathered from one or more sensors deployed on the UAV 102 and may be referred to as sensor data. Sensor data may include temperature data of various components of the UAV 102 or other operational data.

The sensor data may be utilized by the ground station 106 for ad-hoc observation for prolonged time, coastal and border protection, emergency response operation, Special Forces operation, perimeter monitoring, or as a radio relay data.

The UAV 102 may carry a payload 104. For instance, the payload 104 may be attached or mounted on UAV 102 using a mechanical structure 112 or mechanism on the body of UAV 102. The mechanical structure 112 may be a mounting bracket, a pica tinny rail, robotic arm (is), a gimbal, a hook, a loading bay etc. The payload 104 may include but not limited to a camera 220, a radio mast 222, and one or more sensors 224. In one embodiment, the sensors 224 may include a smoke sensor 226, a temperature sensor 228, a GPS sensor 230 and (Chemical, Biological, Radiological, Nuclear) CBRN sensors 232.

Figure 2:
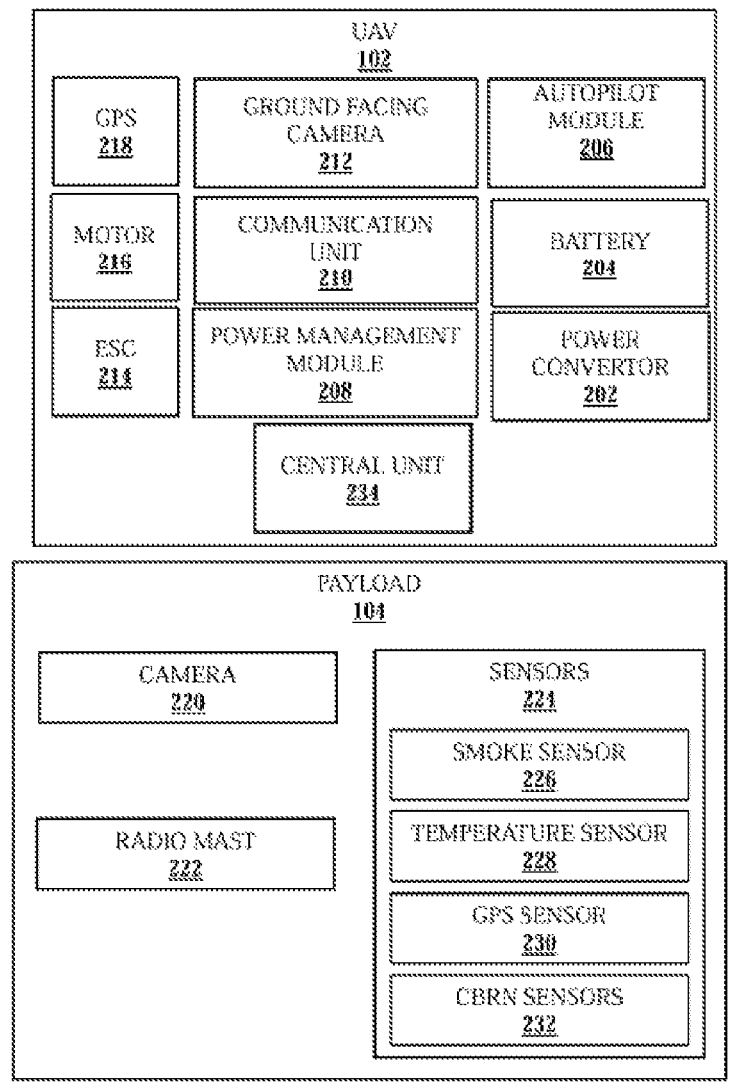
FIG. 2 illustrates block diagrams of the UAV and the payload, according to an embodiment of the present invention.

FIG. 2 illustrates block diagrams of the UAV 102 and the payload 108, according to an embodiment of the present invention.

The UAV 102 may include a power converter 202, a battery 204, an autopilot module 206, a power management module (PMM) 208, a communication unit 210, a Ground Facing Camera (GFC) 212, an Electronic Speed Controller (ESC) 214, a motor 216, a GPS 218 and a central unit 234.

The power converter 202, coupled to the ESC 214, is responsible for converting electric power received from the ground station 106 via the tether cable 108 to a power suited for functions and operational parameters of components of the UAV 102. In one embodiment, the power converter 202 is a reconfigurable power converter capable of supplying varying level of powers to the UAV 102. The power converter 202 may be an AC-DC converter or a DC-DC converter. The power converter 202 may be reconfigured from the ground station 106 even during flight of the UAV 102 without requiring the UAV 102 to land at the ground station 106. In other embodiments, the power converter 202 receives power for the UAV 102 and further supplies the power at varying levels. Power may be varied based on an operational status of the UAV 102. The operational status may be weight of payload 104, weight of the UAV 102, flight status that may include any other force being experienced by the UAV 102 like diverting force etc., and power status of the UAV 102.

The battery 204 is an on-board battery at the UAV 102 to supply power to the UAV 102 in certain circumstances like disruption of power supply from the ground station, and the UAV entering an autopilot mode etc. The battery 204 may be a disposable or rechargeable battery of different chemistry types. The UAV 102 may further comprise a battery recharging circuit coupled to the tether cable 108 for recharging the battery while UAV 102 is powered by the ground power supply. Additionally, a supercapacitor may be used as the battery 204. The battery 202 may also be charged while the UAV 102 is powered by the ground power supply. The battery 204 may be attached on the UAV 102 using a mechanism which may be remotely controlled to detach/attach the battery 204 when required.

The autopilot module 206 is responsible for putting the UAV 102 in autopilot mode under certain predetermined conditions. For example, the UAV 102 may be put in the autopilot mode when there is disruption of power supply from the ground station 106.

The PMM 208 is responsible for overall control and supply of power to the UAV 102. The PMM 208 also switches between the power converter 202 and battery 204 based on power requirements and prevailing conditions at the UAV 102.

The communication unit 210 is responsible for performing wired/wireless communication with ground station and other flying objects.

In an embodiment, the GFC 212 is coupled to the autopilot module 206. The GFC 212 may be a day and night vision camera.

The ESC 214, coupled to the central unit 234, and the motor 216 provides flying/hovering capability to the UAV.

The GPS 218 provides GPS coordinates or location of the airborne UAV 102. The GPS coordinates may be provided to the ground station 106. The GPS may be substituted or replaced by any available global satellite navigation system or an inertial navigation system or an ego-motion base navigation system.

Figure 3:
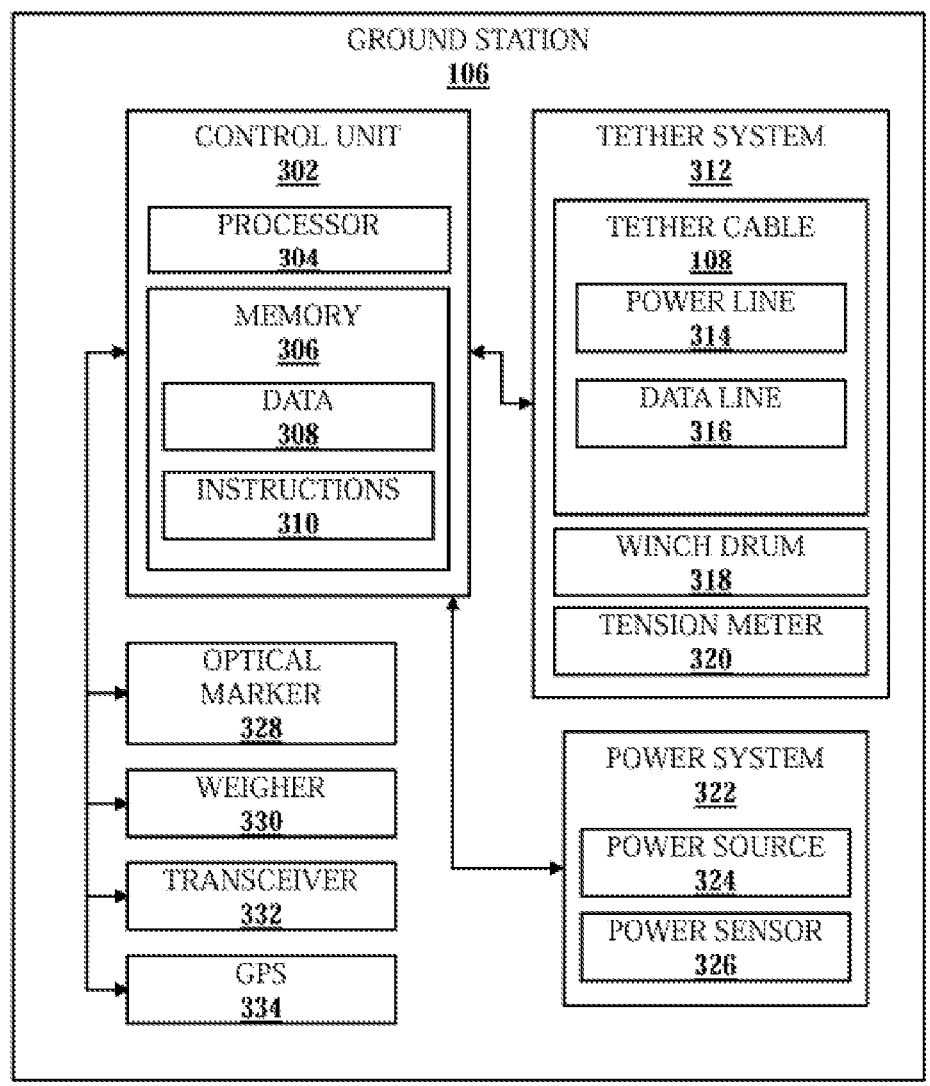
FIG. 3 illustrates a block diagram of the ground station, according to an embodiment of the present invention.

In one embodiment, the UAV 102 comprises the GPS 218 and the ground station 106 may include a GPS 334 (FIG. 3).

The payload 104 may include but not limited to a camera 220, a radio mast 222, and one or more sensors 224. In one embodiment, the sensors 224 may include a smoke sensor 226, a temperature sensor 228, a GPS sensor 230 and (Chemical, Biological, Radiological, Nuclear) CBRN sensors 232.

In one embodiment, primary payload carrying capacity of the UAV 102 may be about 5 kilograms. The payload may be communicatively coupled to the ground station using the network 110 and may draw power from the UAV 102 or the tether cable 108. In an embodiment, the tether cable 108 and electrical/electronic components of the UAV 102, and the payload 104 may be enclosed in a hardened case or coated with a protecting material to protect from CBRN attacks or other hostile environments.

In operation, power level from the power converter 202 is determined. Power level is compared with a predetermined threshold power value. In case the power level is below the predetermined threshold, the UAV 202 switches to the auto pilot mode. In the autopilot mode, the UAV 102 is powered by on board battery 204 and may be programmed to safely land on ground or a target position when the battery stamina goes below 5%. During autopilot mode, the UAV 102 starts a wireless communication its corresponding ground station. For example, the UAV 102 may be put in the autopilot mode when there is disruption of power supply from the ground station 106.

The autopilot module 206 is coupled to the power management module 208. The autopilot module 206 receives an input, indicative of power status of the UAV, from the PMM 208 and in response switches to the battery 204 for supplying power to the UAV 102.

Further, in the autopilot mode, the GFC 212 is activated. The GFC 212 detects marks on the ground, such as infrared laser marks on the ground generates optical signals either in the visible or in non-visible regime corresponding to the detected marks. In one example, the optical signals are continually generated by maintaining the detected marks in the field-of-view of the GFC 212 during ascent or descent of the UAV. In another embodiment, the marks are applied on a moving platform and the UAV 102 is instructed to follow the moving platform without any human assistance.

Thereafter, the GFC 212 reports the optical signals to the auto-pilot module 206. The auto-pilot module 206 may then adjust the trajectory of the UAV 102 based on the optical signals. Such an arrangement of adjusting the trajectory based on the marks facilitates in maneuvering the UAV 102 to a target position in night or cloudy conditions when visibility of the ground is low. The ESC 214 may control or regulate the speed of the motor 214, during the autopilot mode, based on instructions from the ground station 106, the central unit 234, or pre-programmed instructions. The pre-programmed instructions may be saved in the central unit 234 and/or the autopilot module 206.

The data from the GPS 334 is transmitted to the autopilot module 206. In response to receiving the data from the GPS 334, the autopilot module 206 is configured to adjust the trajectory of the UAV 102 so as to follow the ground station 106 which may be moving or stationary. Therefore, using this two GPS method, the UAV 102 may be made to follow the ground station 106 and monitor a targeted area even when the tether cable 108 is broken. The same principle can be used for safely landing the UAV on a target positon on grounds when the tether cable 108 is broken.

FIG. 3 illustrates a block diagram of the ground station, according to an embodiment of the present invention. The ground station 106 may include a control unit 302 communicatively coupled to a power system 322, a tether system 312, an optical marker 328, a weigher 330, a transceiver 332, and a GPS 334.

In one embodiment, the control unit 302 may include a processor 304 and a memory 306 communicatively coupled to the processor 304. The memory 306 may include data 308, and instructions 310. The control unit 302 manages overall functioning of the ground station 106 and control of the UAV 108. The control unit 302 sends and receives data or instructions to the tether system 312 and the power system 322. Further, the control unit 302 sends and receives data or instructions to the UAV 102 or other ground stations, via the transceiver 332.

In one embodiment, the ground station includes the optical marker 328 to create the marks. The marks may be captured by the GFC 212 of the UAV 102.

The weigher 330 may determine weights of the UAV 102, a weight of a payload, a weight of the tether cable 108 released from the ground station 108.

The GPS 334 may provide GPS coordinates of the ground station 106 to the UAV 102 or any other station or requesting device that is authorized. Further, the GPS 334 may coordinate with GPS 218 for implanting the two GPS method as described with reference to FIG. 2.

In one embodiment, the tether system 312 may include the tether cable 108, a winch drum 318, and a tension meter 320. The tether cable 108 may include a power line 314 and a data line 316.

In some embodiments, the tether cable 108 may serve at least three functions. First, the tether cable 108 provides a mechanical restraint to the UAV 102 to keep the UAV 102 within predetermined spatial parameters during flight. Secondly, the tether cable may provide a continuous electric power from the ground station 106 to the UAV 102 via the power line 314.

Thirdly, the tether cable 108 may include or support a wired communication link between the UAV 102 and the ground station 106 via the data line 316. Further, an optical fiber may also be incorporated in the tether cable 108 for providing a communication or an optical scope between the ground station 106 and the UAV 102. The optical scope may be used to capture images for variety of purposes while the UAV 102 is airborne.

The tether cable 108 may be controlled using the winch drum 318 and the tension meter 320. In one embodiment, the winch drum is an electric winch drum and releases or retracts the tether cable 108 based on a reading of the tension meter 320. The reading of the tension meter 320 may also be utilized by the control unit 302 to determine a diverting force acting on the UAV 102. Based on magnitude of the diverting force, the control unit 302 may supply a corresponding electric power to the UAV 102.

In one embodiment, the power system 322 may include a power source 324 and a power sensor 326. The power source 324 may be an alternating current or direct current power sources. The power source 324 may supply electrical power to the UAV 102. From the power source 324 power is transmitted via the tether cable 108 to the power converter 202 of the UAV 102. In one embodiment, the power source 324 may include one of a generator, a battery bank, an AC power line, a household power source, a fuel cell, and a solar panel.

In one embodiment, the power converter 202 is a reconfigurable DC-DC convertor. The power converter 202 converts and conditions the power received from the power source 324 to a DC/AC power suitable for the proper functioning of the UAV 102. Thereafter, the DC/AC power may be routed via the power management module 208 to various components of the UAV 102 such as the battery 204, the autopilot module 206, the communication unit 210, the GFC 212, the ESC 214, the motor 216, and the GPS 218. The electrical power may also be supplied to the payload 104 if required.

The ground station 106 may further include power converters for accepting any of the available power source(s) to produce a required operating power supply. In some cases, the power system 322 may function as a universal power converter. The power system 322 may include a power conditioning module for condition in the power supply received from the power source 324.

In operation, the power sensor 326 may be attached or coupled to the power source 324. The power sensor 324 may detect an energy level of the power source 324. The energy level of the power source 324 may be communicated to the control unit 302. The control unit 302 may communicate this information to the central unit 234 of the UAV 102 via transceiver 332, the tether cable 108, and the communication unit 210 of the UAV 102. On receiving the information, the UAV 102 may be initiated into the autopilot mode where the power supply to the UAV 102 is provided by the battery 204.

In the alternative embodiment, the battery 204 may supply power to the various components of the UAV 102. In yet another embodiment, the battery 204 may supply power to only mission critical components or to components required to maintain of the flight of UAV 102. If there is any malfunction in the tether cable 108 or the power cannot be supplied to the UAV 102 from the ground station 106, the power management module 208 puts the UAV 102 in autopilot mode. In the autopilot mode, the battery 204 acts as the primary power source and the communication between the UAV 102 and ground station 106 may be carried via a wireless link 110 instead of via the tether cable 108. In some embodiments, for extended period of UAV 102 operation, the DC-DC power converter 202 is automatically switched off after a predetermined time interval and the UAV 102 is powered only by battery 204. By switching off the DC-DC power converter 202, the UAV 102 may hover for prolonged time period.

Figure 4:
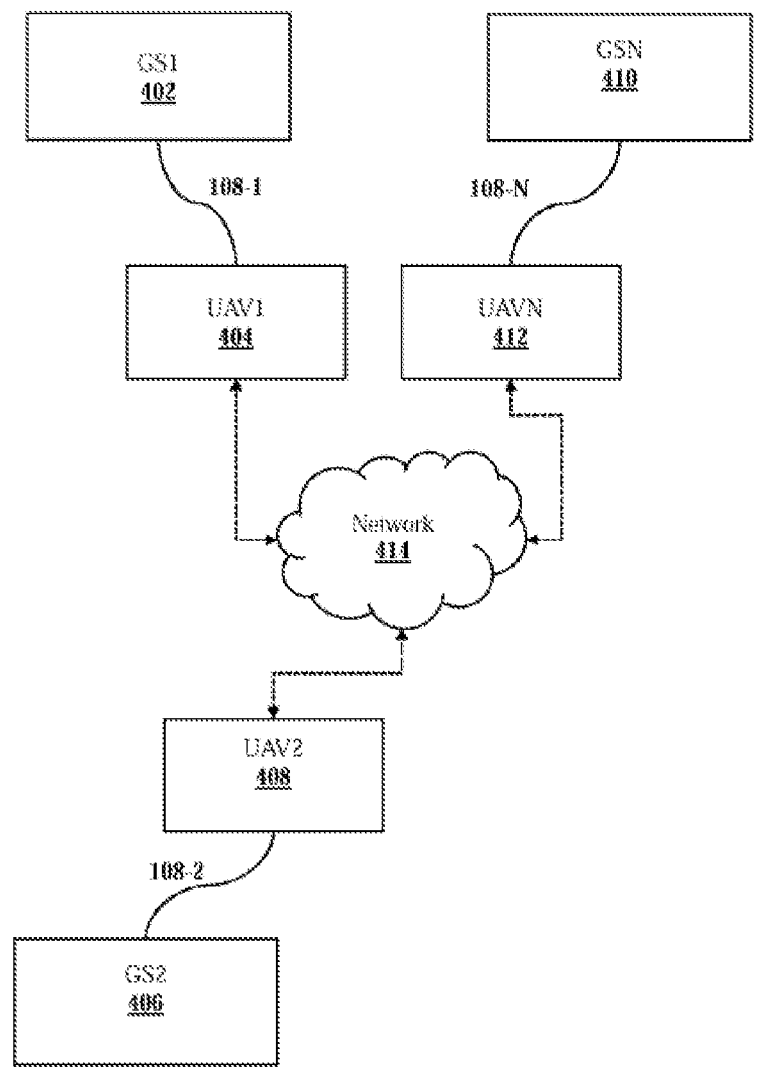
FIG. 4 illustrates a schematic diagram of a plurality of UAVs coordinating with one another, according to an embodiment of the present invention.

FIG. 4 illustrates a schematic diagram of a plurality of UAVs 404, 408, and 412 coordinating with one another, according to an embodiment of the present invention.

Each of the plurality of UAVs 404, 408, and 412 may be communicatively coupled to a corresponding ground station via a tether cable. For example, UAVs 404, 408, and 412 may be communicatively coupled to a plurality of ground stations GS1 402, GS2 406, GSN 410 respectively via tether cables 108-1, 108-2, and 108-N. The plurality of UAVs 404, 408, and 412 may coordinate with one another to achieve a specific purpose or mission. For example, the plurality of UAVs 404, 408, and 412 may coordinate to monitor a larger area under observation. In another embodiment, one or more UAVs 404, 408, and 412 may be on standby and takes over from a malfunctioning UAV. In another embodiment, the plurality of the UAVs 404, 408, and 412 may form a relay to transmit a message or data to long distances. In yet another embodiment, an airborne network is formed between the pluralities of UAVs 404, 408, and 412 for exchanging or relaying data. The tether cables 108-1, 108-2, and 108-3 may be of different types or of same type. Similarly, it is contemplated that the plurality of the UAVs may carry same or different payloads.

In one embodiment, the UAVs form an aerial surveillance system. The system includes the plurality of UAVs 404, 408, and 412. Each UAV includes a communication unit 210-1, 210-2, 210-n (collectively referred to as 210). Each UAV shares surveillance data with other UAVs via the communication unit 210 using wireless communication via a network 414. The plurality of ground stations may be located at different geographical locations. Each UAV may be detachably coupled to one ground station via a tether cable. In one embodiment, the tether cable is configured to supply a predetermined electric power to the UAV. The electric power may be determined based on weight of a payload being carried by the UAV. In one embodiment, the tether cable is further configured to carry communication data between the UAV and the corresponding ground station.

In one embodiment, the predetermined electric power is supplied by an on board reconfigurable power converter. In one embodiment, the plurality of UAVs forms a wireless network. The wireless network may be one of a star network, a mesh network, and a ring network.

The network 414 may be any network including, but not limited to, an optical network, a cellular network, a satellite network, a Local Area Network (LAN), IEEE 802.XX network, Wide Area Network (WAN), SCSI, ATA, and the Internet or a combination thereof.

Figure 5:
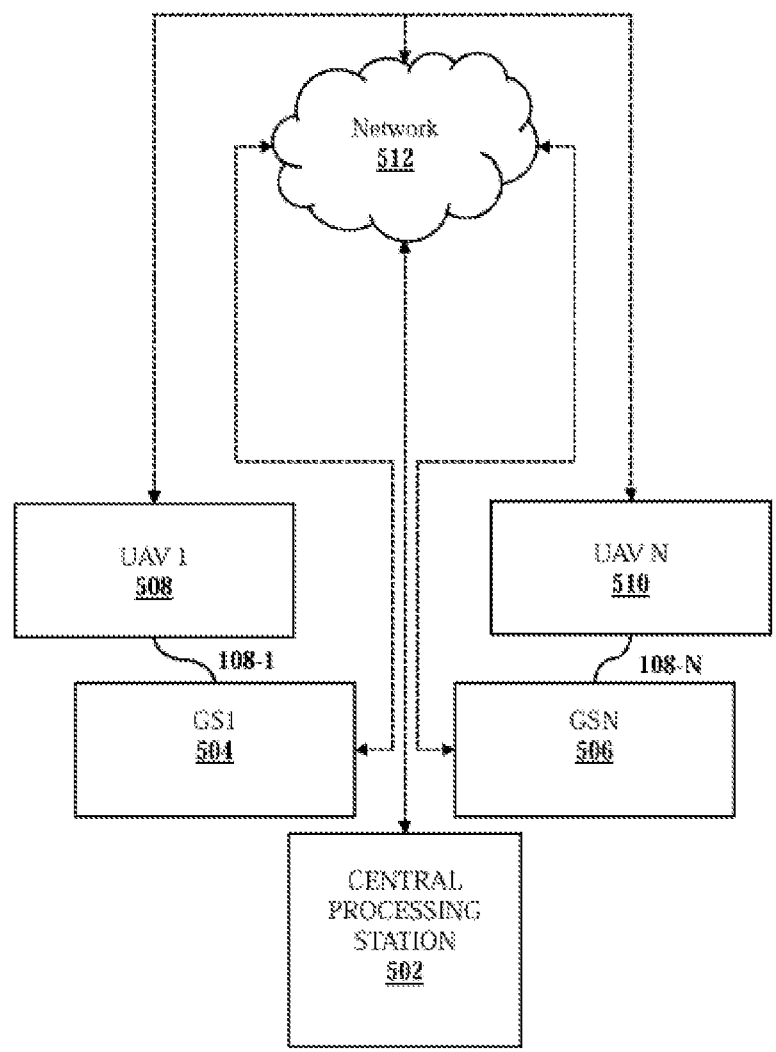
FIG. 5 illustrates a schematic diagram of a plurality of UAVs and a plurality of ground stations coordinating with one another through a central processing station, according to an embodiment of the present invention.

FIG. 5 illustrates a schematic diagram of a plurality of UAVs 508, 510 and a plurality of ground stations 504, 506 coordinating with one another through a central processing station 502, according to an embodiment of the present invention.

The plurality of ground stations 504, 506 and the plurality of UAVs 508, 510 are communicatively coupled to the central processing station 502 via a communication network 512. The central processing station 502 is configured to monitor the ground stations 504, 506 and the UAVs 508, 510 based on one or more predetermined parameters. In one embodiment, the central processing station 502 is further configured to process data received from the ground stations 504, 506 and the UAVs 508, 510. In one embodiment, the central processing station 502 is further configured to send commands and data to the ground stations and the UAVs.

In one embodiment, the plurality of ground stations 504, 506 are communicatively coupled to one another via the communication network 512. The communication network 512 may include a wired network, a wireless network, or a combination thereof.

The ground stations 504 (GS1)-506 (GSN) may be stationed in different geographical locations on earth such as in different states or countries. One or more ground stations 504 (GS1)-506 (GSN) may be located on land and other may be located on water. All ground stations 504 (GS1)-506 (GSN) may be controlled via the CPS 410. In another embodiment, the ground stations 504 (GS1)-506 (GSN) may utilize an internet/cloud service for inter station communications.

Figure 6A:
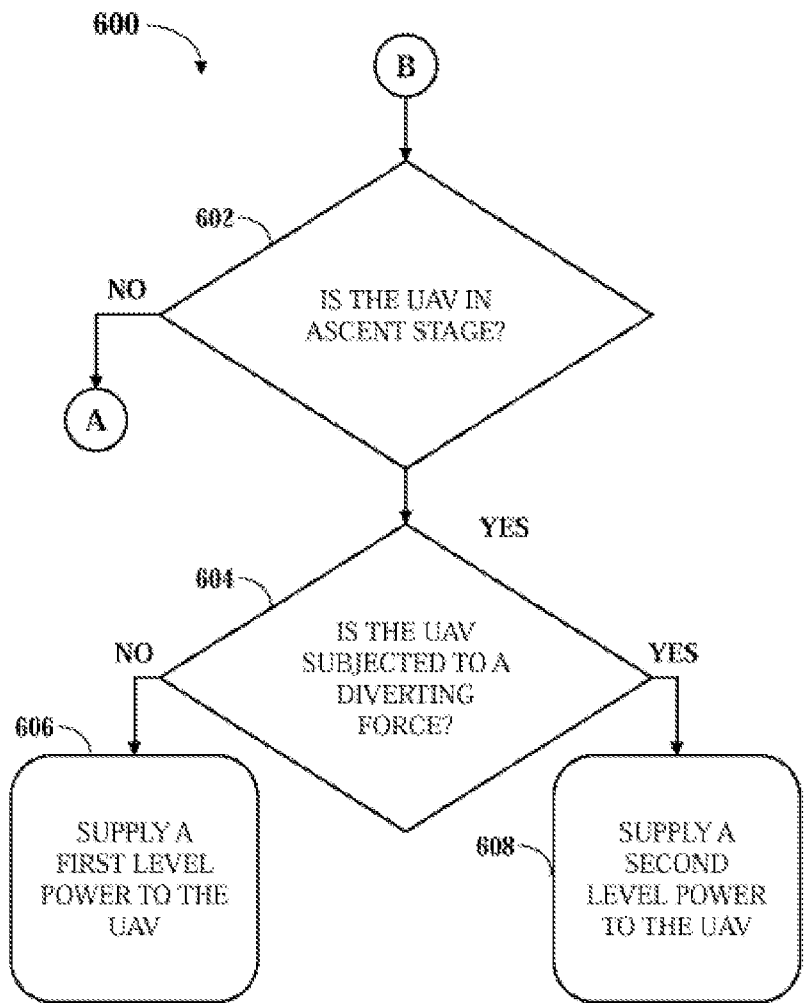
FIG. 6A and FIG. 6B illustrate a method for supplying varying power to the UAV from a ground power source based on a status of the UAV and presence of a diverting force, according to an embodiment of the present invention.
Figure 6B:
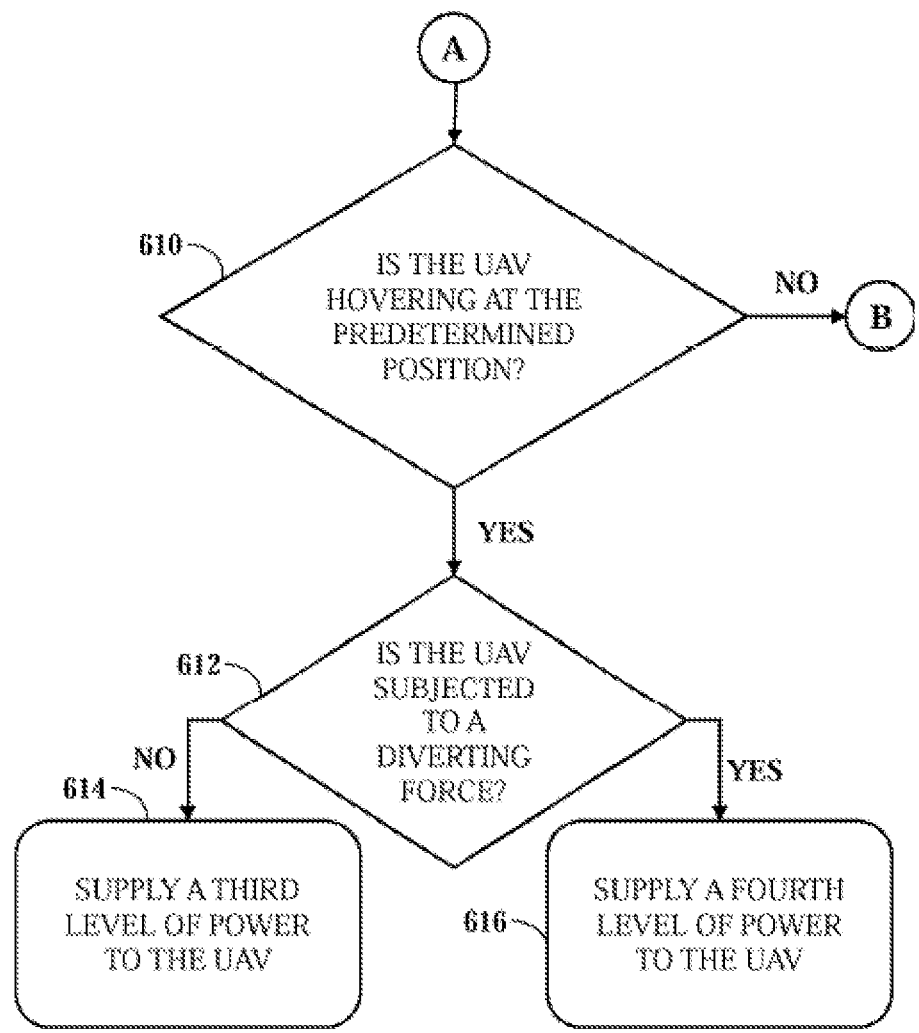

FIG. 6A and FIG. 6B illustrate a method 600 for supplying an appropriate level of electrical power to the UAV 102 from the power source 324. The method begins at step 602 where it is determined whether the UAV 102 is in an ascent stage.

When the UAV 102 is not in the ascent stage, the method 600 proceeds to step 610 (FIG. 6B). If the UAV 102 is in the ascent stage, it is further determined in step 604, whether the UAV 102 is subjected to a diverting force. If the UAV 102 is not subjected to the diverting force, the reconfigurable power converter 202 supplies a first level power to the UAV 102 in step 606. However, if the UAV 102 is subjected to a diverting force the reconfigurable power converter 202 supplies a second level power to the UAV 102 in step 608.

In step 610, it is determined whether the UAV 102 is hovering at a predetermined position. When the UAV 102 is not hovering, the method 600 proceeds to step 602 (FIG. 6A). If the UAV 102 is hovering at the predetermined position, it is further determined in step 612, whether the UAV 102 is subjected to a diverting force. If the UAV 102 is not subjected to the diverting force, the reconfigurable power converter 202 supplies a third level power to the UAV 102 in step 614. However, if the UAV 102 is subjected to a diverting force the reconfigurable power converter 202 supplies a fourth level power to the UAV 102 in step 616.

The control unit 302 is configured to determine the first level power, the second level power, the third level power, and the fourth level power based on one or more of the weight of the UAV 102, a weight of a payload 104, a weight of the tether cable 108 released from the ground station 106, and the diverting force. In one embodiment, the diverting force may include at least one of a gravitation force, a wind force, and a push or pull mechanical force by an object.

Figure 6C:
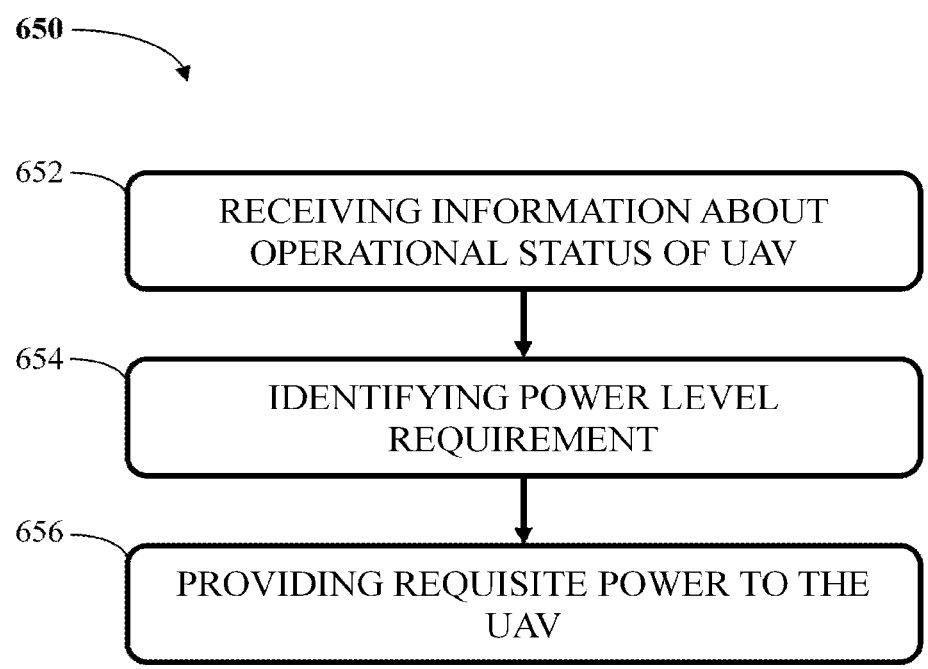
FIG. 6C illustrates a method for supplying requisite power to a UAV, according to an embodiment of the invention.

FIG. 6C illustrates a method 650 for supplying requisite power to the UAV 102, according to an embodiment of the invention. The method 650 begins at step 652, wherein the information about operational status of the UAV 102 is received. The operational status may be either the payload weight being carried by the UAV, any disruption in power from the power source, UAV 102 in ascending status or descending status etc. At step 654, the power level requirement of the UAV is identified. Further, at step 656, requisite power is provided to the UAV 102, identified in the previous step.

Figure 7:
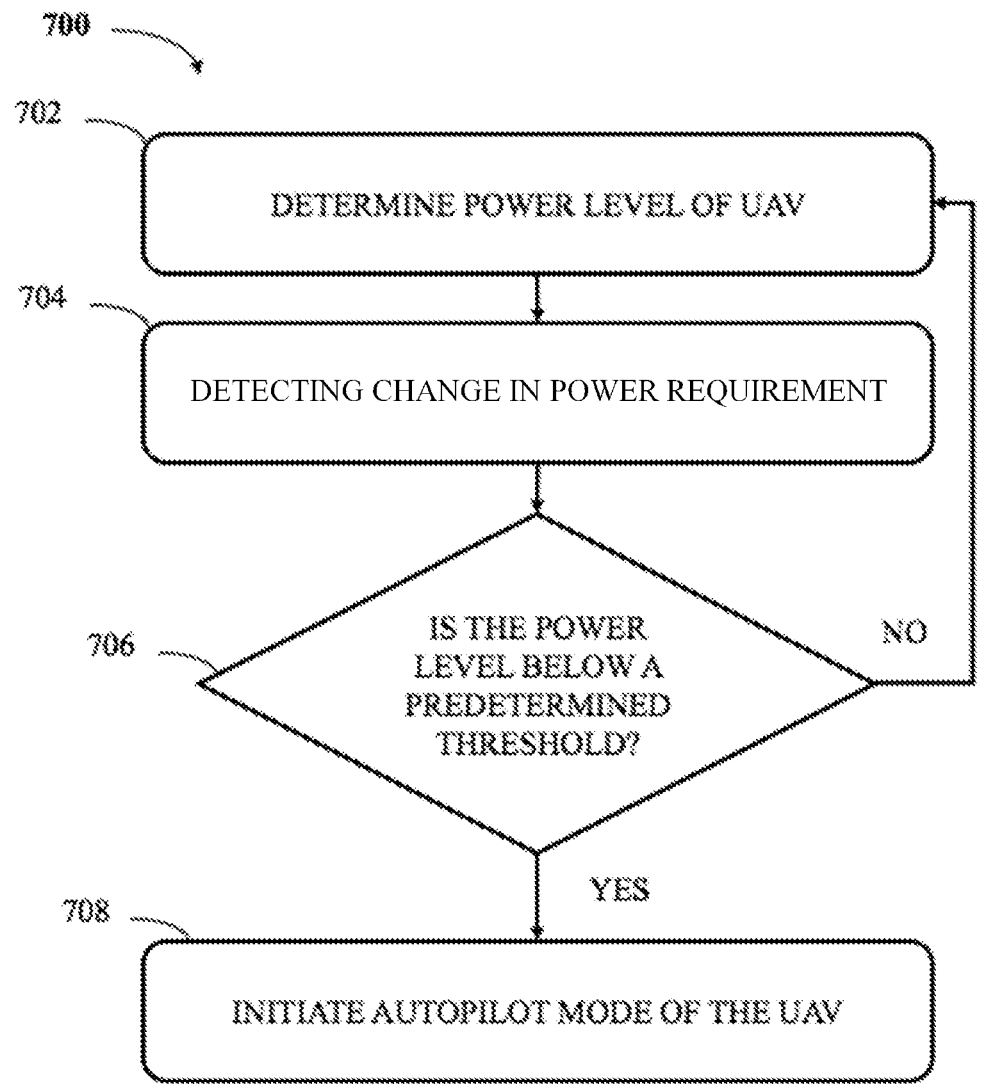
FIG. 7 illustrates a method for initiating an autopilot mode of the UAV, according to an embodiment of the present invention.

FIG. 7 illustrates a method 700 for initiating an autopilot mode of the UAV 102, according to an embodiment of the present invention. The method 700 begins at step 702, wherein any power level change from the power source 324 is identified. At step, 704 it is detected if there is a change in power requirement level of the UAV 102. Further, at step, 706, it is determined whether current power level from the source 324 is below the predetermined threshold. If the power level is not below the threshold level, the method 700 returns to step 702. If the power level is below the predetermined threshold then the method proceeds to step 708, where the autopilot mode of the UAV 102 may be initiated. In the autopilot mode, the power is supplied to the UAV 102 from the battery 204.

Figure 8:
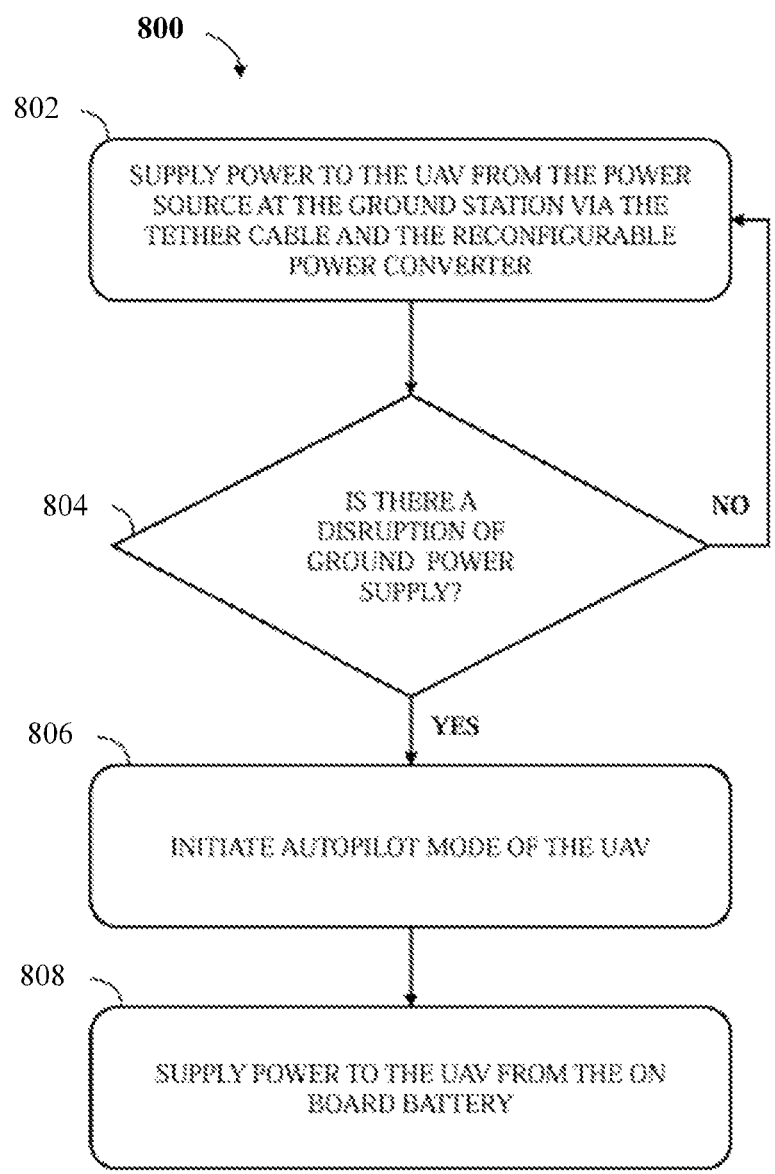
FIG. 8 illustrates a method for initiating an autopilot mode of the UAV due to disruption of power supply to the UAV, according to an embodiment of the present invention.

FIG. 8 illustrates a method 800 for initiating an autopilot mode of the UAV 102 due to disruption power supply via the tether cable 108, according to an embodiment of the present invention. The method 800 begins at step 802, where in normal flight of the UAV 102, power is supplied to the UAV 102 from the power source 324 via the tether cable 108 and the reconfigurable power converter 202. At step 804, it is determined whether there is a disruption of power supply from the power source 324 to the UAV 102. The disruption may be due to ground power supply failure or breakage of the tether cable 108, breakage of only the power line 314 of the tether cable 108, or any other damage to the tether cable 108 or the power line 314. If there is no disruption in normal power supply, the method 800 returns to the step 802. If there is disruption in normal power supply then the method 800 proceeds to step 806, where the autopilot mode of the UAV 102 may be initiated. In the autopilot mode, in step 808, the power is supplied to the UAV 102 from the battery 204.

Figure 9:
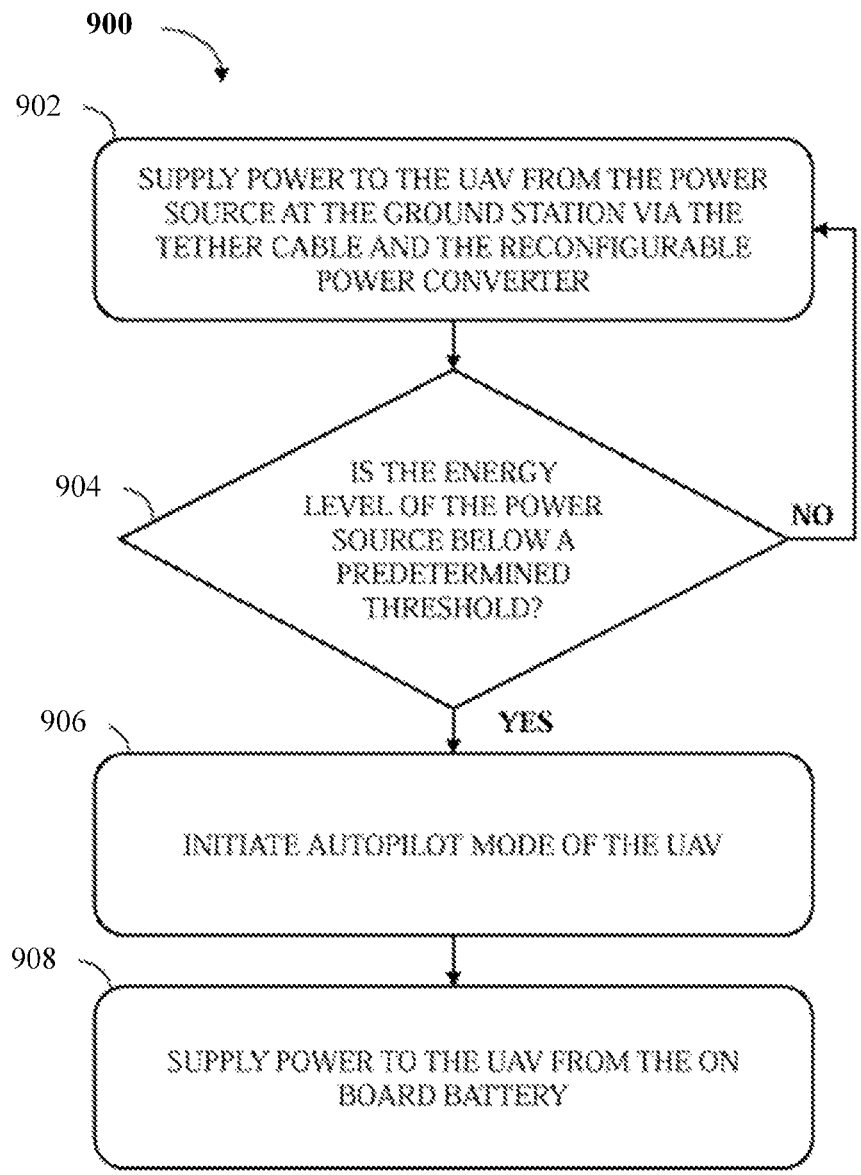
FIG. 9 illustrates a method for initiating an autopilot mode of the UAV based on an energy level of the power source, according to an embodiment of the present invention.

FIG. 9 illustrates a method 900 for initiating an autopilot mode of the UAV 102 based on an energy level of the power source 324, according to an embodiment of the present invention. The method 800 begins at step 902, where in normal flight of the UAV 102, power is supplied to the UAV 102 from the power source 324 via the tether cable 108 and the reconfigurable power converter 202. In step 904, it is determined whether the energy level of the power source 324 is below a predetermined threshold. If the energy level is not below the predetermined threshold, the method 900 returns to step 902. However, if energy level is below the predetermined threshold the method 900 proceeds to the step 906. In step 906, the autopilot mode of the UAV 102 is initiated. In step 808, the power is supplied to the UAV 102 from the battery 204.

Figure 10:
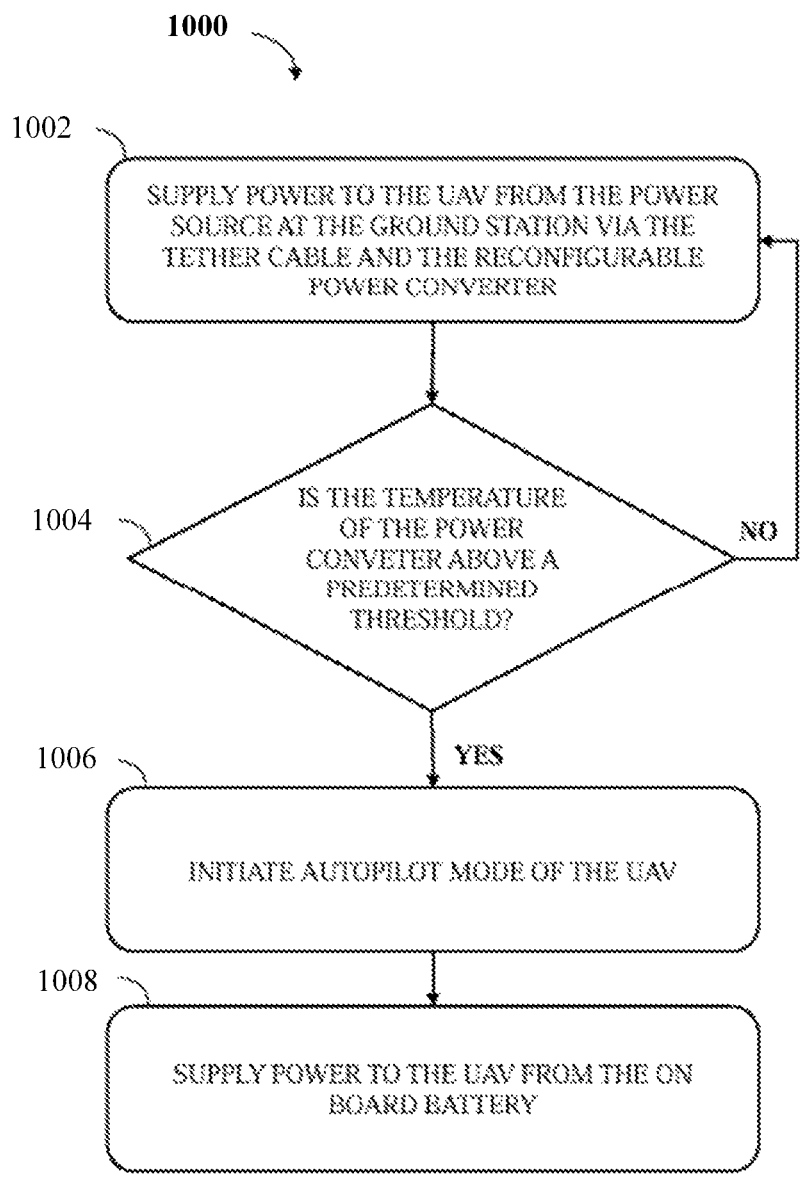
FIG. 10 illustrates a method for initiating an autopilot mode of the UAV based on a temperature of the power converter, according to an embodiment of the present inventions.

FIG. 10 illustrates a method 1000 for initiating an autopilot mode of the UAV 102 based on a temperature of the power converter 202, according to an embodiment of the present invention. The method 1000 begins at step 1002, where in normal flight of the UAV 102, power is supplied to the UAV 102 from the power source 324 via the tether cable 108 and the reconfigurable power converter 202. In step 1004, it is determined whether the temperature of the power converter 202 is above a predetermined threshold. If the temperature is not above the predetermined threshold, the method 1000 returns to step 1002. However, if the temperature is above the predetermined threshold the method 1000 proceeds to the step 1006. In one embodiment, the temperature sensor 228 monitors the temperature of the power converter 202 and reports to the central unit 234. In step 1006, the autopilot mode of the UAV 108 is initiated. In one embodiment, the central unit 234 commands the autopilot module 206 to put the UAV 102 in the autopilot mode. In step 1008, the power is supplied to the UAV 108 from the battery 204 while the UAV 102 is in the autopilot mode. Thereafter, the battery 204 functions as the primary power source to the UAV 102. Subsequently, the power converter 202 may be switched-off for cooling down. In one embodiment, the battery 204 may function as the primary power source till the temperature of the power converter 202 comes within the predetermined temperature threshold.

Figure 11:
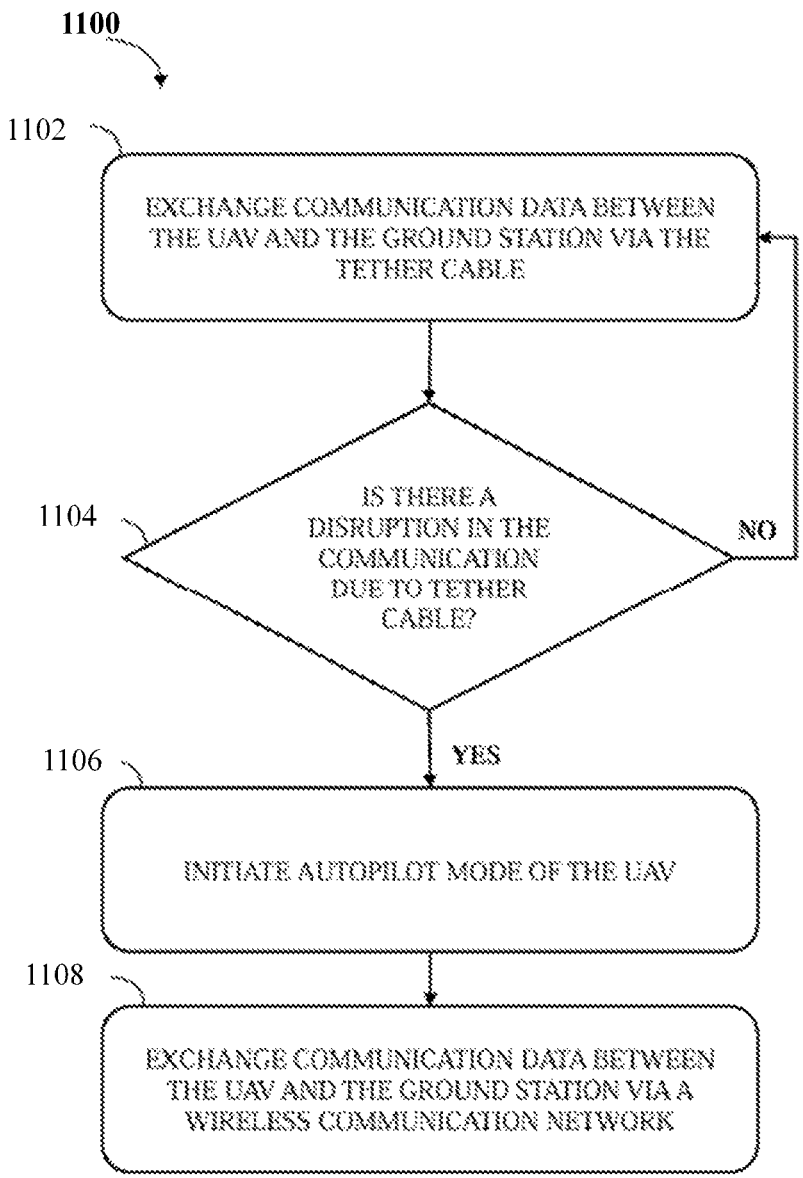
FIG. 11 illustrates a method for initiating wireless communication between the UAV and the ground station, according to an embodiment of the present invention.

FIG. 11 illustrates a method 1100 for initiating wireless communication between the UAV 102 and the ground station 106, according to an embodiment of the present invention. The method 1100 begins at step 1102, wherein in normal operation of the UAV 102 the communication data between the UAV 102 and the ground station 106 is exchanged via the tether cable 108. At step 1104, it is determined whether there is a disruption of communication between the UAV 102 and the ground station 106 due to the tether cable 108. The disruption may be due to breakage of the tether cable 108, breakage of only the data line 316 of the tether cable 108, or any other damage to the tether cable 108 or the data line 316. If there is no disruption in normal communication, the method 1100 returns to the step 1102. If there is disruption in normal communication then the method 1100 proceeds to step 1106, where the autopilot mode of the UAV 102 may be initiated.

In the autopilot mode, in step 1108, the communication data between the UAV 102 and the ground station 106 is exchanged via a wireless communication network.

The control unit 302, the central unit 234, and the CPS 502 may be in form of computer processing unit having any and all features and capabilities of such processing units. Further, the present disclosure is applicable to all types of on-chip and off chip memories used in various in digital electronic circuitry, or in hardware, firmware, or in computer hardware, firmware, software, or in combination thereof. Apparatus of the invention can be implemented in a computer program product tangibly embodied in a machine-readable storage device for execution by a programmable processor; and methods actions can be performed by a programmable processor executing a program of instructions to perform functions of the invention by operating on input data and generating output. The invention can be implemented advantageously on a programmable system including at least one input device, and at least one output device. Each computer program can be implemented in a high-level procedural or object-oriented programming language or in assembly or machine language, if desired; and in any case, the language can be a compiled or interpreted language.

Suitable processors include, by way of example, both general and specific microprocessors. Generally, a processor will receive instructions and data from a read-only memory and/or a random-access memory. Generally, a computer will include one or more mass storage devices for storing data file; such devices include magnetic disks and cards, such as internal hard disks, and removable disks and cards; magneto-optical disks; and optical disks. Storage devices suitable for tangibly embodying computer program instructions and data include all forms of volatile and non-volatile memory, including by way of example semiconductor memory devices, such as EPROM, EEPROM, and flash memory devices; magnetic disks such as internal hard disks and removable disks; magneto-optical disks; CD-ROM and DVD-ROM disks; and buffer circuits such as latches and/or flip flops. Any of the foregoing can be supplemented by, or incorporated in ASICs (application-specific integrated circuits), FPGAs (field-programmable gate arrays) and/or DSPs (digital signal processors).

Therefore, the present subject matter provides an efficient system for powering a UAV 102. The power requirement of the UAV 102 depends on the operational status of the UAV 102, wherein the operational status may be either the payload weight being carried by the UAV, any disruption in power from the power source 324, UAV 102 in ascending status or descending status etc. The system determines power level requirement of the UAV 102 and efficiently provides suitable power to the UAV 102 for its flight. This mechanism therefore, makes sure that the UAV 102 has adequate power level through-out its flight. Further, the present subject matter detects in case there is a drop in the power level from the power source 324 to the UAV 102. The UAV 102 may switch to an autopilot mode in order to land safely.

It will be apparent to those having ordinary skill in this art that various modifications and variations may be made to the embodiments disclosed herein, consistent with the present disclosure, without departing from the spirit and scope of the present disclosure. Other embodiments consistent with the present disclosure will become apparent from consideration of the specification and the practice of the description disclosed herein

What is claimed is:

1. A tethered unmanned aerial vehicle (UAV) comprising:
   a central unit to store pre-programmed instructions for operation of the UAV;
   an electronic speed controller, coupled to the central unit, to regulate flying speed of the UAV; and
   a power converter, coupled to the electronic speed controller to:
   receive power for the UAV;
   determine an operational status of the UAV; and
   provide a predefined level of power based on the operational status to supply the power;
   wherein the operational status of the UAV is one of a payload weight, a flight status, a diverting force of the UAV and a power status of the UAV.

2. The tethered UAV of claim 1 further comprising a power management module, coupled to the power converter, to switch between the power converter and a battery based on a power requirement of the UAV, wherein the battery is on board the UAV to supply power stored within the battery.

3. The tethered UAV of claim 1, further comprising an auto pilot module, coupled to the power management module, to:
   receive an input from the power management module; and
   activate the battery for power supply to the UAV.

4. The tethered UAV of claim 3, further comprising a ground facing camera (GFC) coupled to the autopilot module to:
   provide a field of view of ground;
   detect an optical signal from a marker on the ground within the field of view, wherein the optical signals are of visible or non-visible nature; and
   adjust trajectory for landing of the UAV based on the optical signals.

5. A method for supplying requisite power to a tethered UAV comprising:
   receiving information about an operational status of the UAV;
   identifying power level requirement of the UAV based on the operational status;
   wherein the operational status is at least one of a payload, a diverting force, and a flight status of the UAV and a power status of the UAV; and
   providing requisite power to the UAV, based on the determined power level requirement.

* * * * *